United States Patent

Hu et al.

Patent Number: 5,913,183
Date of Patent: Jun. 15, 1999

[54] CHECK DEVICE FOR AIR ACTIVATED PRESSURE VALVE

[75] Inventors: Tain-Jenn Hu, Pang-Tung; Jeng-Ding Tseng, Hsin-Chu; Philip J. Lin, Taipei, all of Taiwan

[73] Assignee: Taiwan Semiconductor Manufacturing Company, Ltd., Hsin-Chu, Taiwan

[21] Appl. No.: 08/826,731

[22] Filed: Apr. 7, 1997

[51] Int. Cl.[6] .................................................. F16K 37/00
[52] U.S. Cl. ........................... 702/98; 340/626; 137/557
[58] Field of Search ............................ 702/50, 98–138, 702/140, 188; 137/554, 557; 340/626

[56] References Cited

U.S. PATENT DOCUMENTS

| | | | |
|---|---|---|---|
| 4,341,241 | 7/1982 | Baker | 137/554 |
| 4,545,406 | 10/1985 | King | 702/100 |
| 4,718,445 | 1/1988 | Lundberg et al. | 137/556 |
| 5,033,012 | 7/1991 | Wohld | 702/41 |
| 5,251,148 | 10/1993 | Haines et al. | 364/509 |
| 5,316,217 | 5/1994 | Guzowski et al. | 137/557 |
| 5,558,115 | 9/1996 | Lenz et al. | 137/86 |

Primary Examiner—John Barlow
Assistant Examiner—Craig Steven Miller
Attorney, Agent, or Firm—George O. Saile; Stephen B. Ackerman

[57] ABSTRACT

A modified air activated pressure valve is described, together with a method for its manufacture, that has a pressure sensitive switch located in the inlet chamber and in the outlet chamber. These pressure sensitive switches are preset by the user to output a finite voltage (typically about 5 volts) only when they are exposed to a pressure that exceeeds some value. The outputs of both switches may then be displayed, as needed. Additionally, a display circuit is provided that gives an output signal only when both the inlet and the outlet chambers are at or above their intended pressures.

19 Claims, 1 Drawing Sheet

CHECK DEVICE FOR AIR ACTIVATED PRESSURE VALVE

BACKGROUND OF THE INVENTION

(1) FIELD OF THE INVENTION

The invention relates to the general field of pressure valves, more particularly air activated pressure valves, and the in-situ monitoring of their performance.

(2) DESCRIPTION OF THE PRIOR ART

Air activated pressure valves are widely used for the control of fluid flow. The basic unit consists of a flow valve, such as a butterfly valve, suitable for use with fluids such as nitrogen or argon gas. The valve is activated by remote control by means of compressed dry air (CDA). This method for adjusting the rate of flow through fluid valves is preferred to electrically controlled valves since the mechanism that is involved is cheaper and more compact than a solenoid, as well as being less susceptible to possible corrosion by the fluid concerned.

A number of sophisticated (and hence expensive) systems have been described for use in controlling fluid flow. Of particular interest are the systems in which the necessary sensors are located within the valve mechanism itself. These systems could conceivably be used to also check on the functionality of the pressure valves but, if that were their sole purpose, they would represent a case of overkill, particularly in systems containing large numbers of pressure valves each of which needs to have its performance checked, either continuously or as desired. Under these circumstances, it is important to be able to use a checking system that has minimum cost.

An example of a full fledged control system for an air activated pressure valve is that described by Haines et al. in U.S. Pat. No. 5,251,148 (October 1993). This system includes pressure sensors (as opposed to pressure switches) located inside both the inlet and outlet chambers. The outputs from these pressure sensors are used to continuously control a throttle (valve plug) by means of a suitable actuator mechanism. In order for this device to operate it is necessary to measure the position of the valve plug, the valve inlet pressure, the valve outlet pressure, and the valve fluid temperature.

Given these measurements, the associated electronics of the Haines et al. system are then used to compute several (typically 9) numerical quantities the final result being used to determine the best current position for the valve plug.

A similar system (in the sense of being sophisticated, precise, and expensive) has been described by Lenz et al. (U.S. Pat. No. 5,558,115 September 1996). The heart of their system is a feedback loop between the inlet and outlet pressure sensors. This allows dynamic correction of unintended changes in fluid flow rates and also provides diagnostic information in the event of malfunction.

The present invention is concerned with monitoring pressure valve performance rather than controlling fluid flow.

SUMMARY OF THE INVENTION

It has been an object of the present invention to provide a method and apparatus for monitoring the functionality of an air activated pressure valve.

Another object of the present invention has been that said apparatus be of minimum cost such that the functionality, and only the funtionality, of the valve is monitored on a go nogo basis.

A further object has been that the functionality of the valve be capable of being monitored continuously and/or only when needed.

A still further object has been that the method and apparatus of the present invention be suitable for use with multiple valves simultaneously, whereby the status of each of the valves be capable of continuous display.

These objects have been achieved by providing an air activated pressure valve, together with a description of a method for its manufacture, that has a pressure switch located in both the inlet and outlet chambers. These pressure switches are preset by the user to output a finite voltage (typically about 4 volts) only when they are exposed to a pressure that exceeeds some value. The outputs of both switches may then be displayed, as needed. Additionally, a display circuit is provided that gives an output signal only when both the inlet and the outlet chambers are at or above their intended pressures.

DESCRIPTION OF THE PREFERRED EMBODIMENTS

As already indicated, the present invention has as its limited objective the goal of monitoring the functionality of an air activated pressure valve as cheaply as possible. The intent is to provide an output signal from the valve that confirms that the valve is performing within some predetermined set of specifications. We have determined that a minimum of two such specifications is sufficient. These are that the pressure in air actuator 2 should exceed some certain minimum (typically about 30 PSIG (pounds per square inch greater than atmospheric)) and that the pressure in outlet chamber 5 should also exceed some certain minimum (typically about 5 PSIG). The cost of embodying the invention is kept to a minimum by using pressure-sensitive switches rather than pressure sensors. The former output a fixed voltage whenever the pressure exceeds some preset value (and no voltage when the pressure does not). The latter outputs a variable voltage that is proportional to pressure.

Figure 1:
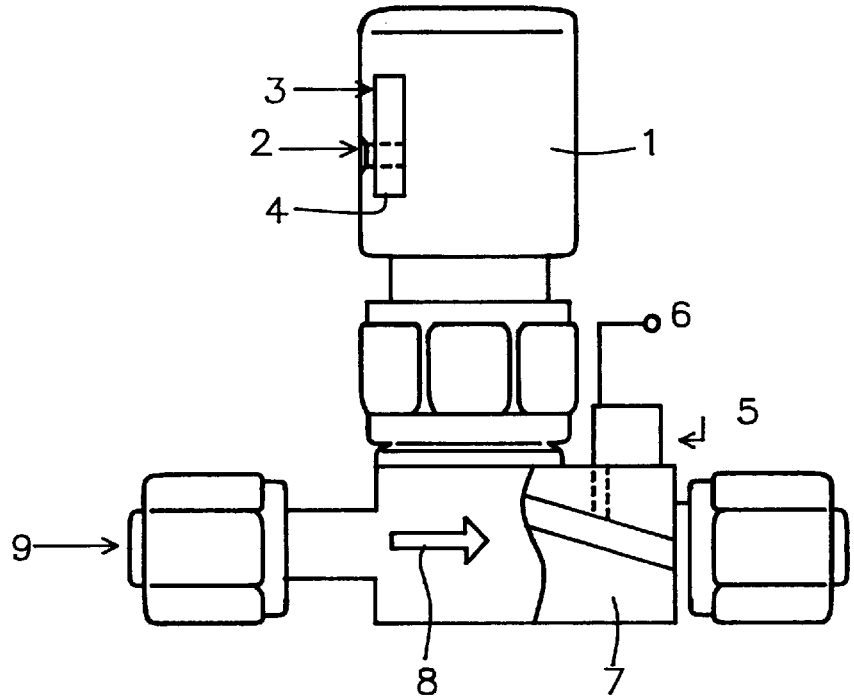
FIG. 1 shows an air activated pressure valve as modified by the present invention to include pressure sensitive switches in both the inlet and outlet chambers.

Referring now to FIG. 1, a simplified diagram of an air activated pressure valve is shown. An example of this type of valve that we have used has been an air actuated bellows valve but any similar valve could be modified in the manner of the present invention as described below. CDA is admitted to inlet chamber 1 thru CDA inlet 2. The pressure in chamber 1 is sensed by pressure-sensitive switch 3 having an electrical output 4. The latter puts out no voltage until the pressure inside chamber 1 exceeds some preset amount.

The specific pressure at which 3 will switch and start putting out voltage at 4 is determined by the user. Typically, switching is set to occur in a pressure range of from about 30 to 110 PSIG and the voltage that is outputted at 4 will typically be between about 3.3 and 10 volts DC or 110V AC, depending on the power supply. The pressure sensitive switches that we have elected to use have been industrial grade pressure switches or vacuum switches, chosen by us because their reliability and low cost, but any similar pressure-sensitive switches could have been used with equal effectiveness.

Continuing our reference to FIG. 1, the fluid that is to be metered by the air activated valve is admitted at 9 into outlet chamber 7 through which it flows in direction 8. The pressure in chamber 7 is sensed by pressure sensitive switch 5 having an electrical output 6. The latter puts out no voltage until the pressure inside chamber 7 exceeds some preset amount.

The specific pressure at which 5 will switch and start putting voltage out at 6 is also determined by the user. Typically, switching is set to occur in a pressure range of from about 5 to 3,500 PSIG and the voltage that is outputted at 4 will typically be between about 3.3 and 10 volts DC or 11V AC, depending on the type of power supply.

Figure 2:
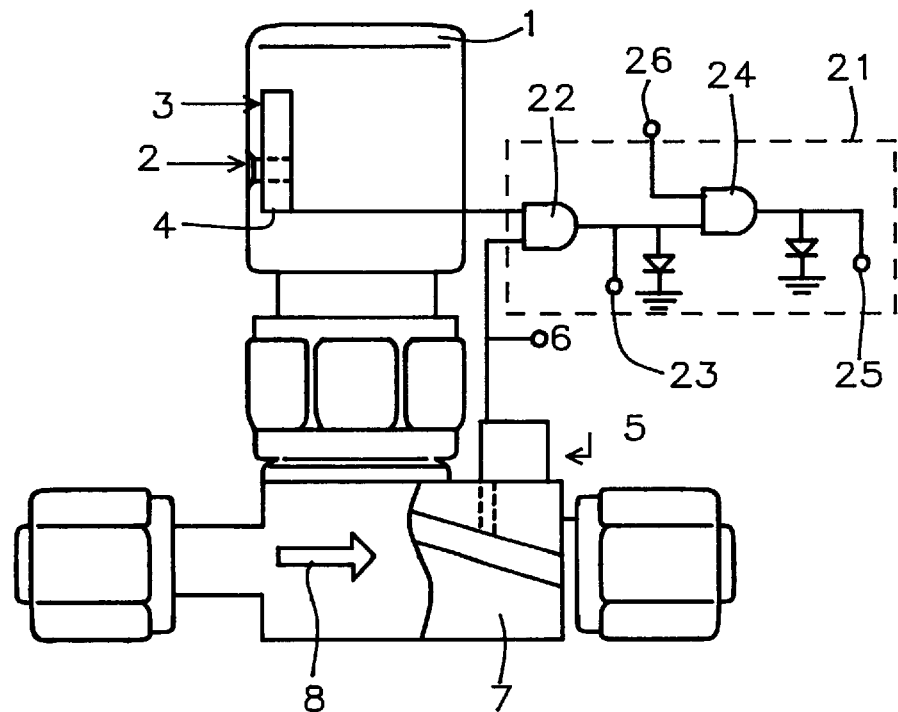
FIG. 2 shows a pressure sensitive valve as seen in FIG. 1 along with a display circuit that allows the functionality of the valve to be monitored either continuously or as needed.

Referring now to FIG. 2, the same arrangement as seen in FIG. 1 is shown together with the control circuit 21 to which outputs 4 and 6 of pressure switches 3 and 5 respectively serve as inputs. 4 and 6 are connected to AND gate 22 whose output is designated as 23. Output 23 may be read externally and is also connected to AND gate 24 whose output is 25. The second input to AND gate 24 is external control signal 26 which is used whenever it is desired to check the state of output 23.

Thus, depending on the needs of the system, outputs 4 and 6 may be read separately, a check as to whether both 4 and 6 are on may be continuously read at 23, or the status of 4 and 6 may be checked, as needed, by activating control signal 26. Regardless of which outputs are to be read, multiple units such as the one illustrated in FIG. 2 could have any or all of their outputs displayed on a common display board. In a large fluid control system having anywhere from about 10 to 50 air activated pressure valves such a display will make available instant information as to the state of all valves. The display could take one or more of several possible forms. These include any type of light emitting device such as an incandescent or neon bulb, FED or LCD devices, analog meters, digital meters, a loud speaker (for example to sound an alarm). These output signals could also be fed to a computer for data acquisition and control.

While the invention has been particularly shown and described with reference to the preferred embodiments thereof, it will be understood by those skilled in the art that various changes in form and details may be made without departing from the spirit and scope of the invention.

What is claimed is:

1. A checking device for an air activated pressure valve, comprising:

an air activated pressure valve having an inlet chamber and an outlet chamber;

a first pressure sensitive switch, having a first switch output and preset to switch within a first pressure range, located inside the inlet chamber;

a second pressure sensitive switch, having a second switch output and preset to switch within a second pressure range, located inside the outlet chamber;

a connection between said first switch output and a first input to a first AND gate having a first AND output;

a connection between said second switch output and a second input to said first AND gate;

a connection between said first AND output and a first input to a second AND gate having a second AND output; and a connection between an externally generated control signal and a second input to said second AND gate.

2. The checking device of claim 1 wherein the first pressure range is between about 30 and 110 PSIG.

3. The checking device of claim 1 wherein the second pressure range is between about 5 and 3,500 PSIG.

4. The checking device of claim 1 further comprising a connection between said first AND output and an external user interface.

5. The checking device of claim 4 wherein said external user interface is taken from the group consisting of a light emitting device, an analog meter, a digital meter, a loud speaker, a computer, and a data acquisition/control terminal.

6. The checking device of claim 1 further comprising a connection between said second AND output and an external user interface.

7. The checking device of claim 6 wherein said external user interface is taken from the group consisting of a light emitting device, an analog meter, a digital meter, a loud speaker, a computer, and a data acquisition/control terminal.

8. The checking device of claim 1 wherein said air activated pressure valve is an air-actuated bellows valve.

9. The checking device of claim 1 wherein said pressure sensitive switches are pressure switches or vacuum switches.

10. A method for monitoring the functionality of an air activated pressure valve, comprising:

providing an air activated pressure valve having inlet and outlet chambers;

placing a first pressure sensitive switch, having a first switch output and preset to switch within a first pressure range, inside the inlet chamber;

placing a second pressure sensitive switch, having a second switch output and preset to switch within a second pressure range, inside the outlet chamber;

connecting said first switch output to a first input of a first AND gate that has a first AND output;

connecting said second switch output to a second input of said first AND gate;

connecting said first AND output to a first input of a second AND gate that has a second AND output; and connecting an externally generated control signal to a second input of said second AND gate.

11. The method of claim 10 wherein the first pressure range is between about 30 and 110 PSIG.

12. The method of claim 10 wherein the second pressure range is between about 5 and 3,500 PSIG.

13. The method of claim 10 further comprising connecting said first AND output to an external user interface.

14. The method of claim 13 wherein said external user interface is taken from the group consisting of a light emitting device, an analog meter, a digital meter, a loud speaker, a computer, and a data acquisition/control terminal.

15. The method of claim 10 further comprising connecting said second AND output to an external user interface.

16. The method of claim 15 wherein said external user interface is taken from the group consisting of a light emitting device, an analog meter, a digital meter, a loud speaker, a computer, and a data acquisition/control terminal.

17. The method of claim 10 wherein said air activated pressure valve is an air-actuated bellows valve.

18. The method of claim 10 wherein said pressure sensitive switches are pressure switches or vacuum switches.

19. The method of claim 10 further comprising combining a plurality of said first and second AND outputs so as to form a display board for all the AND outputs.

* * * * *